(12) United States Patent
Konieczny et al.

(10) Patent No.: US 6,293,138 B1
(45) Date of Patent: Sep. 25, 2001

(54) APPARATUS AND METHOD FOR INTRODUCING LEAK DETECTION DYE INTO AN AIR CONDITIONING SYSTEM

(75) Inventors: Donald L. Konieczny; Eric William Kesler, both of Northville; Michael A. Olesnavich, Bloomfield Hills, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/458,458

(22) Filed: Dec. 10, 1999

(51) Int. Cl.⁷ .................................................. G01M 3/20
(52) U.S. Cl. ......................................................... 73/40.7
(58) Field of Search ................................................ 73/40.7

(56) References Cited

U.S. PATENT DOCUMENTS

| Re. 35,370 | 11/1996 | Henry . |
| Re. 35,395 | 12/1996 | Henry . |
| 3,770,640 | 11/1973 | Bartlett . |
| 4,758,366 | 7/1988 | Parekh . |
| 4,938,063 | 7/1990 | Leighley . |
| 5,149,453 | 9/1992 | Parekh . |
| 5,167,140 | 12/1992 | Cooper et al. . |
| 5,440,919 | 8/1995 | Cooper ................................... 73/40.7 |
| 5,650,563 | 7/1997 | Cooper et al. ......................... 73/40.7 |
| 5,681,984 | 10/1997 | Cavestri ................................. 73/40.7 |

*Primary Examiner*—Daniel S. Larkin
(74) *Attorney, Agent, or Firm*—Larry I. Shelton

(57) ABSTRACT

An apparatus and method for introducing a leak detection dye into an air conditioning system includes a cradle, a leak detection dye held by the cradle and a mechanism for securing the cradle into a component of the air conditioning system.

20 Claims, 2 Drawing Sheets

APPARATUS AND METHOD FOR INTRODUCING LEAK DETECTION DYE INTO AN AIR CONDITIONING SYSTEM

BACKGROUND OF THE INVENTION

1. Field of the Invention

The present invention relates generally to air conditioning systems for motor vehicles and, more specifically, to an apparatus and method for introducing leak detection dye into an air conditioning system in a motor vehicle.

2. Description of the Related Art

It is known to provide an air conditioning system for a motor vehicle. The air conditioning system typically carries a fluid medium such as a refrigerant to cool air for an occupant compartment of the motor vehicle. Although the air conditioning system works well, it is desirable to test the air conditioning system for leaks of the refrigerant.

It is also known to introduce a leak detection dye into the air conditioning system to detect and locate leaks of the refrigerant. An example of a method of introducing leak detection dye into an air conditioning system is disclosed in U.S. Pat. No. 5,440,919. In this patent, a predetermined amount of liquid leak detection additive is implanted on and absorbed into a host swatch of a substrate material, which is capable of absorbing and releasing the leak detection additive. The swatch is installed in a desiccant bag, which is then installed in a receiver/dryer or dehydrator of the air conditioning system. The air conditioning system is assembled, charged and operated, in which the refrigerant and system lubricant flowing through the desiccant bag mixes the additive with the refrigerant and system lubricant. The air conditioning system is then illuminated with ultra-violet illumination and the dye fluoresces to give an indication of a leak in the air conditioning system.

It is also known that the leak detection dye may be formed as a solid, gel, paste or the like as opposed to a liquid. However, if the leak, detection dye is not placed in the desiccant bag, the leak detection dye may travel through the air conditioning system when initially charged and plug or close an opening thereof.

It is desirable to introduce leak detection dye into an air conditioning system that is placed in high pressure, high temperature areas which will dissolve the dye quickly other than a receiver/dryer or dehydrator which contains low pressure vapor and tends to dissolve dye more slowly. It is also desirable to introduce leak detection dye into an air conditioning system without using a carrier or substrate. It is further desirable to introduce leak detection dye into an air conditioning system using a solid, gel, or paste form of the leak detection dye. Therefore, there is a need in the art to introduce leak detection dye into an air conditioning system that accomplishes these desires.

SUMMARY OF THE INVENTION

Accordingly, the present invention is an apparatus for introducing a leak detection dye into an air conditioning system includes a cradle, a leak detection dye held by the cradle and a mechanism for securing the cradle into a component of the air conditioning system.

Also, the present invention is a method of introducing a leak detection dye into an air conditioning system. The method includes the steps of providing a cradle and placing a leak detection dye into the cradle. The method includes the steps of assembling the cradle to a component of the air conditioning system through which refrigerant circulates and circulating refrigerant through the air conditioning system to dissolve the leak detection dye into the refrigerant.

One advantage of the present invention is that a method is provided of introducing leak detection dye into an air conditioning system of a vehicle. Another advantage of the present invention is that the method uses the leak detection dye in a solid, gel, or paste form to introduce it into the air conditioning system. Yet another advantage of the present invention is that an apparatus is provided to hold the leak detection dye and may be placed in other areas than the receiver/dryer (accumulator) or dehydrator, such as an orifice tube or TXV filter. Still another advantage of the present invention is that the method and apparatus eliminate wasted material, such as a substrate or carrier for the leak detection dye. A further advantage of the present invention is that the apparatus is placed in high-pressure liquid which will aid in dissolving the leak detection dye in the form of a pill or gel and introduce it into the air conditioning system quicker.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
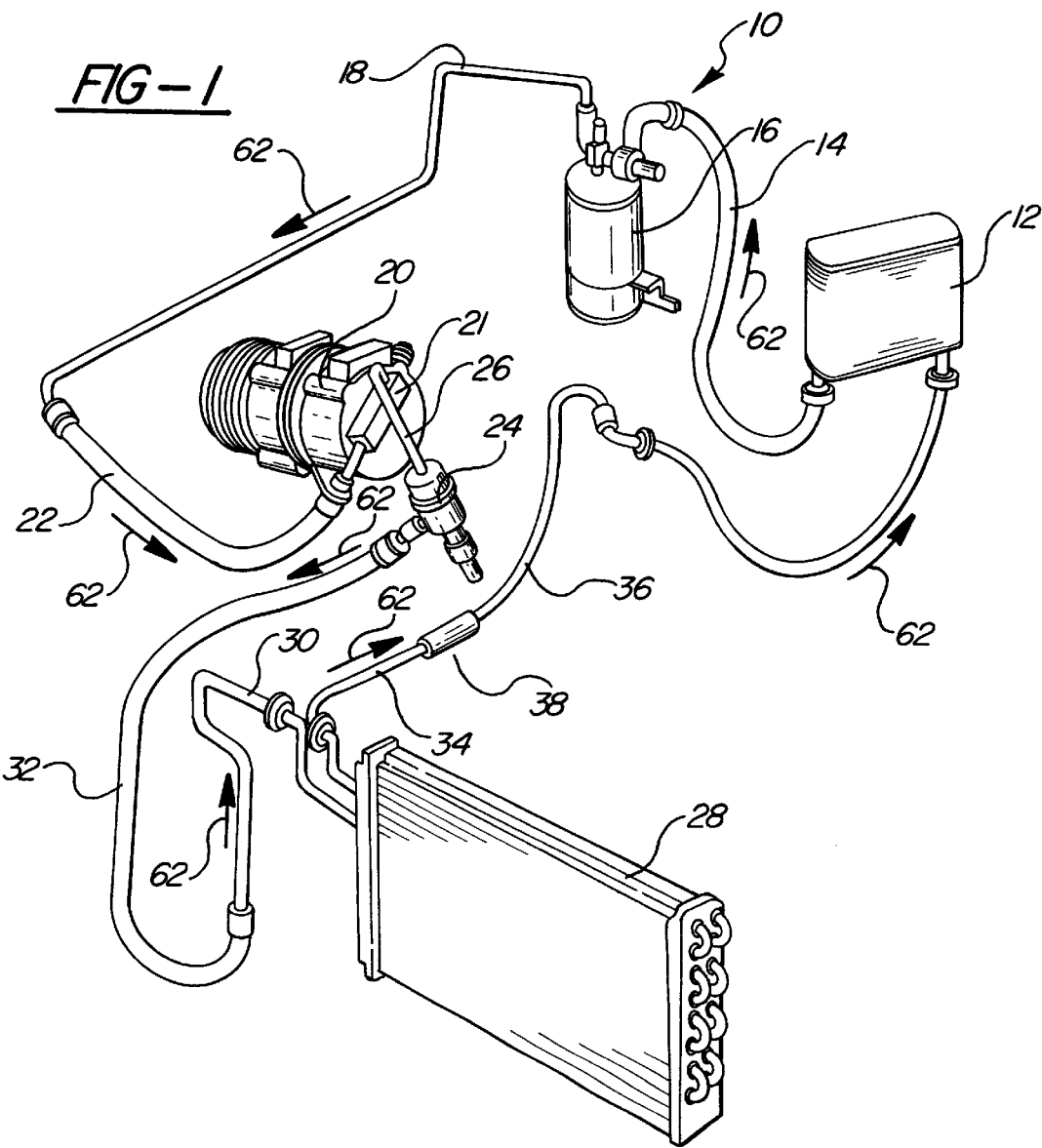
FIG. 1 is a perspective view of an air conditioning system incorporating an apparatus, according to the present invention, for use with a method of introducing leak detection dye into the air conditioning system, according to the present invention.

Referring to the drawings and in particular FIG. 1, one embodiment of an air conditioning system 10 is shown for a motor vehicle (not shown). The air conditioning system 10 includes an evaporator 12 and a tube or conduit 14 having one end connected to an outlet of the evaporator 12. The air conditioning system 10 also includes a suction accumulator 16 connected to the other end of the conduit 14 and another tube or conduit 18 having one end connected to the suction accumulator 16. The air conditioning system 10 includes a compressor 20 with a manifold 21 and a suction line or conduit 22 having one end connected to the manifold 21 and the other end connected to the conduit 18. The air conditioning system 10 may include a muffler 24 and a tube or conduit 26 interconnecting the muffler 24 and the manifold 21 of the compressor 20. The air conditioning system 10 also includes a condenser 28 and a tube or conduit 30 having one end connected to an inlet of the condenser 28. The air conditioning system 10 includes a discharge line or conduit 32 having one end connected to the conduit 30 and another end connected to the muffler 24. The air conditioning system 10 further includes a liquid line or conduit 34 interconnecting an outlet of the condenser 28 and an inlet of the evaporator 12. The air conditioning system 10 includes an orifice tube or conduit 36 connected to the liquid line 34. The air conditioning system 10 further includes an apparatus or cradle assembly, generally indicated at 38, to be described disposed in a component of the air conditioning system 10 such as, and preferably, the orifice tube 36 to introduce a leak detection dye into the air conditioning system 10. The cradle assembly 38 may also be disposed preferably in the suction accumulator 16 or TXV filter (not shown). It should be appreciated that, except for the cradle assembly 38, the air conditioning system 10 is conventional and known in the art. It should also be appreciated that the cradle assembly 38 could be used for air conditioning systems in other applications besides motor vehicles. It should further be appreciated that the cradle assembly 38 may be used with refrigerant systems other than an air conditioning system.

Figure 2:
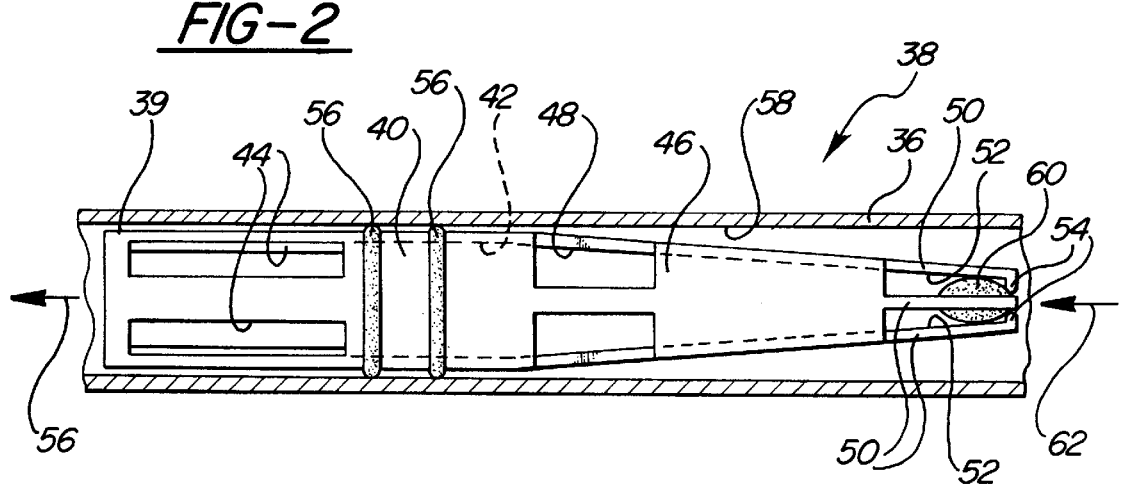
FIG. 2 is an enlarged fragmentary view of the apparatus and a portion of the air conditioning system of FIG. 1.
Figure 3:
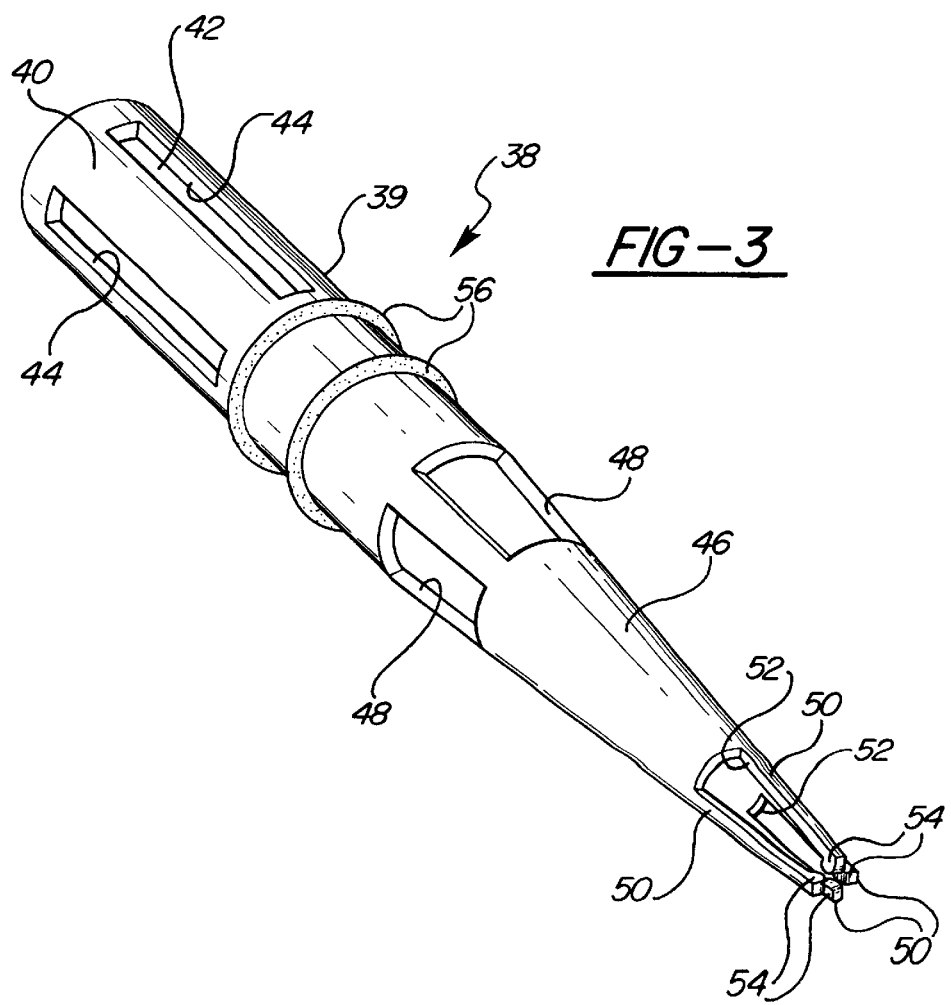
FIG. 3 is a perspective view of the apparatus of FIGS. 1 and 2.

Referring to FIGS. 2 and 3, the cradle assembly 38, according to the present invention, includes a cradle 39 extending longitudinally and being generally cylindrical in shape. The cradle 39 includes a base portion 40 being tubular to form a hollow interior 42 having a generally circular cross-sectional shape. The cradle 39 includes at least one, preferably a plurality of slots 44 extending longitudinally or axially and spaced circumferentially thereabout. The slots 44 are generally rectangular in shape. The cradle 39 also includes a transition portion 46 extending from one end of the base portion 40 and tapering axially and radially inwardly. The transition portion 46 includes at least one, preferably a plurality of apertures or slots 48 spaced circumferentially thereabout. The apertures 48 are generally rectangular in shape. The cradle 39 further includes at least one, preferably a plurality of arms 50 extending from one end of the transition portion 48 and tapering axially and radially inwardly. The arms 50 are spaced circumferentially by slots 52 extending axially. The arms 50 include a projection or flange 54 extending radially from a free end thereof for a function to be described. The cradle 39 is formed of a rigid material, such as plastic. The cradle 39 is a monolithic structure being integral, unitary, and one-piece. It should be appreciated that the cradle 39 may have any suitable cross-sectional shape.

The cradle assembly 38 also includes a mechanism such as at least one, preferably a plurality of seals 56 disposed about the cradle 39 for holding the cradle 39 in the orifice tube 36. The seals 56 are generally 0-rings made of an elastomeric material and disposed about the base portion 40 and spaced axially. It should be appreciated that the seals 56 compress to contact an inner surface 58 of the orifice tube 36 and hold the cradle 39 in the orifice tube 36 in spaced relationship to the inner surface 58. It should be appreciated that any suitable mechanism other than seals may be used to hold the cradle 39 to the component of the air conditioning system 10.

The cradle assembly 38 also includes a leak detection dye 60 disposed between the arms 50 of the cradle 39. The leak detection dye 60 may be in the form of a solid such as a pill, a gel, or a paste. The leak detection dye 60 is of a type disclosed in U.S. Pat. No. 5,681,984 to Cavestri, the disclosure of which is hereby incorporated by reference. It should be appreciated that the leak detection dye 60 in the form of a pill is commercially available from Bright Solutions, Inc., Troy, Mich.

In operation, the leak detection dye 60 is placed in the cradle 39 between the arms 50. The slots 52 allow the arms 50 to flex to insert the leak detection dye 60 therebetween and return to hold the leak detection dye 60 between the arms 50. The flanges 54 prevent the leak detection dye 60 from exiting the arms 50. The seals 56 are placed over the base portion 40 and the cradle assembly 38 is placed in the orifice tube 36. Preferably, the cradle assembly 38 is pre-assembled with the orifice tube 36. The orifice tube 36 is assembled to the other components of the air conditioning system 10 in the vehicle. Once the air conditioning system 10 is assembled and installed into the vehicle, the air conditioning system 10 is evacuated to remove air and moisture prior to charging with the refrigerant. The air conditioning system 10 is charged by releasing refrigerant under pressure from a container (not shown) through charging ports (not shown) to enter the air conditioning system 10. Upon charging and operating the air conditioning system 10, high-pressure liquid refrigerant and system lubricant from the condenser 28 will flow in the direction of the arrows 62 as illustrated in FIGS. 1 and 2. The high pressure liquid refrigerant and system lubricant will flow across the leak detection dye 60 and dissolve the leak detection dye 60 to introduce it into the air conditioning system 10. The dissolved leak detection dye, liquid refrigerant, and system lubricant will flow through the hollow interior 42 of the cradle 39 via the slots 52 and 48 and out of the cradle 39 via the slots 44. Once the leak detection dye 60 is dissolved, the air conditioning system 10 is viewed under ultraviolet light to reveal any leaks of refrigerant which will fluoresce due to the leak detection dye 60 mixed therewith.

Figure 4:
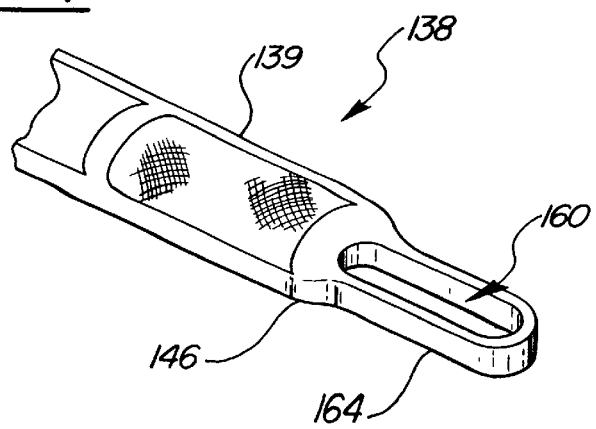
FIG. 4 is a perspective view of another embodiment, according to the present invention, of the apparatus of FIGS. 1 through 3.

Referring to FIG. 4, another embodiment, according to the present invention, of the cradle assembly 38 is shown. Like parts of the cradle assembly 38 have like reference numerals increased by one hundred (100). In this embodiment, the cradle assembly 138 eliminates the arms and includes a holding portion 164 extending from the transition portion 146 of the cradle 139. The holding portion 164 has a curved shape similar to a conventional bathtub to hold the leak detection dye 160 in the form of a gel or paste. The operation of the cradle assembly 138 is similar to the cradle assembly 38. It should be appreciated that the holding portion 164 could have any suitable shape.

A method, according to the present invention, of introducing the leak detection dye 60,160 into the air conditioning system 10 is disclosed. The method includes the steps of providing the apparatus or cradle 39,139 and the leak detection dye 60,160 in the form of a pill, gel, or paste. The method includes the steps of inserting the leak detection dye 60,160 into the cradle 39,139 by placing the pill between arms 50 of the cradle 39 to be held therebetween or placing the gel or paste in a holding portion 164 of the cradle 139. The method includes the steps of assembling the cradle 39,139 to the component of the air conditioning system 10 through which refrigerant circulates by inserting the cradle 39,139 into a liquid side of the component such as the orifice tube 36 and holding the cradle 39,139 in spaced relationship therewith. The method includes the steps of charging the air conditioning system 10 with a refrigerant and circulating refrigerant through the air conditioning system 10 to dissolve the leak detection dye 60,160 into the refrigerant. The method includes the steps of illuminating the air conditioning system 10 with ultra-violet light to check for leaks of the air conditioning system 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An apparatus for introducing a leak detection dye into an air conditioning system, comprising:

a cradle made of a rigid material;

a leak detection dye held by said cradle; and a mechanism to secure said cradle into a component of the air conditioning system.

2. An apparatus as set forth in claim 1 wherein said leak detection dye is a solid.

3. An apparatus as set forth in claim 1 wherein said leak detection dye is a pill.

4. An apparatus as set forth in claim 1 wherein said leak detection dye is a gel.

5. An apparatus as set forth in claim 1 wherein said leak detection dye is a paste.

6. An apparatus for introducing a leak detection dye into an air conditioning system comprising:

a cradle;

a leak detection dye held by said cradle;

a mechanism to secure said cradle into a component of the air conditioning system; and wherein said cradle includes a plurality of arms for holding said leak detection dye therebetween.

7. An apparatus as set forth in claim 6 wherein said arms extend axially and radially inwardly and have a flange extending radially at a free end thereof.

8. An apparatus as set forth in claim 6 wherein said arms are spaced circumferentially about said cradle.

9. An apparatus as set forth in claim 6 wherein said cradle extends axially and is tubular in shape to form a hollow interior.

10. An apparatus as set forth in claim 9 wherein said cradle comprises a base portion extending axially and a transition portion extending axially and radially inwardly, said arms extending from an end of said transition portion.

11. An apparatus as set forth in claim 10 including a plurality of slots in at least one of said base portion and said transition portion.

12. An apparatus for introducing a leak detection dye into an air conditioning system comprising:

a cradle;

a leak detection dye held by said cradle;

a mechanism to secure said cradle into a component of the air conditioning system; and wherein said mechanism comprises at least one seal disposed about said cradle to hold said cradle in spaced relationship to the component.

13. An apparatus for introducing a leak detection dye into an air conditioning system comprising:

a cradle;

a leak detection dye held by said cradle;

a mechanism to secure said cradle into a component of the air conditioning system; and wherein said cradle includes a holding portion having a recess for holding said leak detection dye.

14. A method of introducing a leak detection dye into an air conditioning system, said method comprising the steps of:

providing a cradle made of a rigid material;

placing a leak detection dye onto the cradle;

assembling the cradle to a component of the air conditioning system through which refrigerant circulates; and circulating refrigerant through the air conditioning system to dissolve the leak detection dye into the refrigerant.

15. A method as set forth in claim 14 including the step of charging the air conditioning system with a refrigerant before said step of circulating refrigerant through the air conditioning system.

16. A method as set forth in claim 14 including the step of illuminating the air conditioning system with ultra-violet light to check for leaks of the air conditioning system.

17. A method as set forth in claim 14 including the step of inserting the cradle into a liquid side of the component.

18. A method as set forth in claim 14 wherein said step of placing comprises providing the leak detection dye in the form of a pill and placing the pill between arms of the cradle to be held therebetween.

19. A method as set forth in claim 14 wherein said step of placing comprises providing the leak detection dye in the form of a gel or paste and placing the gel or paste in a holding portion of the cradle.

20. A method of introducing a leak detection dye into an air conditioning system, said method comprising the steps of:

providing a cradle;

placing a leak detection dye onto the cradle;

inserting the cradle into an orifice tube and holding the cradle in spaced relationship therewith;

assembling the orifice tube in the air conditioning system; and circulating refrigerant through the air conditioning system to dissolve the leak detection dye into the refrigerant.

* * * * *